(12) United States Patent
Miller et al.

(10) Patent No.: US 7,032,957 B2
(45) Date of Patent: Apr. 25, 2006

(54) PAYLOAD CONTAINER FOR A WORK MACHINE

(75) Inventors: Cliff E. Miller, Clinton, IL (US); Christopher Scott Laban, San Pedro Garza Garcia (MX); Christopher Charles Cusack, Decatur, IL (US); Daniel Lee Jennings, Mahomet, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/846,642

(22) Filed: May 17, 2004

(65) Prior Publication Data

US 2005/0253418 A1   Nov. 17, 2005

(51) Int. Cl.
*B62D 33/02*   (2006.01)

(52) U.S. Cl. .................... 296/183.2; 296/183.1

(58) Field of Classification Search ............ 296/183.2, 296/183.1, 190.03; 280/748
See application file for complete search history.

(56) References Cited

U.S. PATENT DOCUMENTS

| | | | | |
|---|---|---|---|---|
| 3,163,463 A * | 12/1964 | Femrite | .................... | 296/183.1 |
| 3,455,598 A * | 7/1969 | Edman et al. | .............. | 296/102 |
| 3,897,972 A | 8/1975 | Logue | | |
| 3,938,238 A * | 2/1976 | Kershaw et al. | .............. | 29/469 |
| 4,230,254 A * | 10/1980 | Proeschl | ...................... | 29/469 |
| 4,336,964 A * | 6/1982 | Pivar | ......................... | 296/77.1 |
| 4,474,404 A * | 10/1984 | Hagenbuch | .............. | 296/183.2 |
| 4,621,858 A * | 11/1986 | Hagenbuch | .................. | 296/56 |
| 4,799,726 A | 1/1989 | Scott | | |
| 4,826,233 A * | 5/1989 | Hagenbuch | .............. | 296/183.2 |
| 5,249,843 A * | 10/1993 | Hagenbuch et al. | .... | 298/23 DF |
| 5,474,363 A * | 12/1995 | Hagenbuch | .............. | 298/23 R |
| 5,738,405 A | 4/1998 | Richters et al. | | |
| 5,887,914 A * | 3/1999 | Hagenbuch | .............. | 296/183.2 |
| 6,022,068 A * | 2/2000 | D'Amico | ................. | 296/183.2 |
| 6,129,409 A * | 10/2000 | D'Amico | ................. | 296/183.2 |
| 6,345,858 B1 * | 2/2002 | Franklin et al. | ......... | 296/183.1 |
| 6,481,785 B1 | 11/2002 | Coleman et al. | | |
| 6,491,349 B1 * | 12/2002 | McCafferty et al. | .... | 298/23 DF |
| 6,520,590 B1 | 2/2003 | Feuereisen Azocar | | |
| 6,796,602 B1 * | 9/2004 | Hagenbuch | .............. | 296/186.3 |
| 2002/0167192 A1 * | 11/2002 | Tyrer et al. | ............ | 296/100.11 |

FOREIGN PATENT DOCUMENTS

WO   WO 96/29233   9/1996

* cited by examiner

*Primary Examiner*—Kiran B. Patel
(74) *Attorney, Agent, or Firm*—Finnegan, Henerson, Farabow, Garrett & Dunner LLP

(57) ABSTRACT

A payload container for containing a material to be hauled by a work machine is disclosed. The payload container includes a first sidewall and a second sidewall. A front wall extends between the first and second sidewalls. A canopy extends from a top of the front wall, and includes a mounting frame and at least one panel. The panel is formed of a non-metal material and is secured to the mounting frame.

19 Claims, 7 Drawing Sheets

… (US 7,032,957 B2)

PAYLOAD CONTAINER FOR A WORK MACHINE

TECHNICAL FIELD

This disclosure is directed to a payload container for a work machine and, more particularly, to a payload container including a non-metal material.

BACKGROUND

The amount of a payload that may be hauled in an off-highway truck is often limited by the requirement that the combined weight of the payload and truck not exceed an established maximum gross vehicular weight (GVW). The maximum GVW is a limit established based on such things as torque available from a power-train and weight amounts that can be carried by tires. Because off-highway trucks are manufactured from metals in order to be durable and robust, the trucks also are heavy. Any reduction in the truck's weight allows an operator to increase the payload weight by the same amount without exceeding the GVW. To the operator, any increase in payload translates to an increase in productivity, resulting in higher profits.

In order to maximize the productivity of off-highway trucks, it is desirable to minimize a truck's weight, thereby maximizing the weight of a payload that may be safely carried or transported by the truck. One method for reducing the weight of an off-highway truck is to reduce the thickness of metal components to the minimum amount that will adequately perform the required functionality of the truck. For example, a payload container on an off-highway truck may be manufactured using metal plates with the minimum thickness required to support the weight of a payload. However, even as the thickness of the plates is reduced, the payload containers nonetheless continue to weigh a substantial amount due to the weight of the metal.

Repairs to a damaged payload container can compound the problem of weight. This is because repairs typically require welding or adding additional material to the damaged portion. Accordingly, the overall weight of a payload container may be increased when damage is repaired.

One method for reducing the weight of a freight container is disclosed in International Publication No. WO 96/29233. The '233 publication discloses a freight hauling container including a wall construction formed of a plastic composite. The wall construction includes a sheet-like panel reinforced with stiffeners bonded to the panel. However, the wall construction for the freight container in the '233 publication is not designed to hold the weight of a payload that may be inadvertently dumped on it because it is only used for the walls forming an enclosed freight container. Accordingly, the '233 publication does not disclose a system that could effectively reduce the weight of a non-enclosed payload container.

What is needed is a payload container formed of a light material that reduces the weight of a payload container in areas where a load may be in direct contact with the material, and that may be repaired without increasing the overall weight of the payload container. The present disclosure teaches a system for overcoming one or more of the deficiencies in the prior art.

SUMMARY OF THE INVENTION

In one aspect, the present disclosure is directed to a payload container for containing a material to be hauled by a work machine. The payload container includes a first sidewall and a second sidewall. A front wall extends between the first and second sidewalls. A canopy extends from a top of the front wall, and includes a mounting frame and at least one panel. The panel is formed of a non-metal material and is secured to the mounting frame.

In another aspect, the present disclosure is directed to a method of repairing a payload container on a work machine. At least a part of the payload container is formed of non-metal panels. The method includes identifying a damaged non-metal panel on the payload container and disconnecting the damaged panel from a mounting frame. The damaged panel may then be removed from the mounting frame. A replacement panel may be placed in the mounting frame in place of the damaged panel and secured to the mounting frame.

DETAILED DESCRIPTION

Reference will now be made in detail to exemplary embodiments that are illustrated in the accompanying drawings. Wherever possible, the same reference numbers will be used throughout the drawings to refer to the same or like parts.

Figure 1:
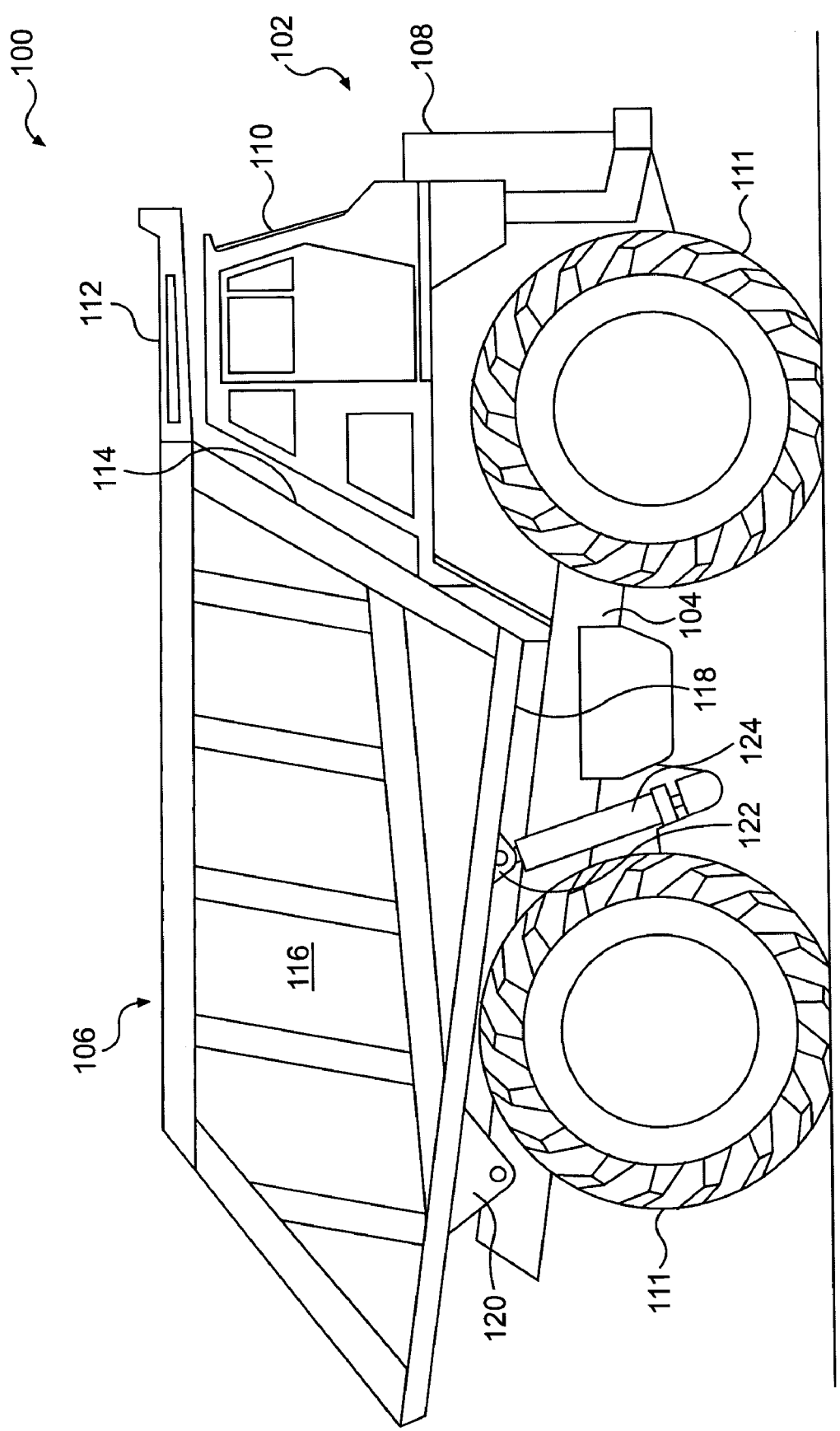
FIG. 1 is a pictorial representation of a work machine in accordance with one exemplary aspect of the present disclosure.

An exemplary embodiment of a work machine 100 is illustrated in FIG. 1. The work machine 100 may be an off-highway truck, as shown, or other vehicle, such as an articulated truck, an off-highway tractor or other work-machine. The exemplary work machine 100 includes a front end 102, a frame 104, and a payload container 106. The front end 102 may include an engine compartment 108 and an operator's cab 110. The engine compartment 108 may house an engine, a transmission, and/or other components used to power the work machine 100. The operator's cab 110 may include controls for operating and driving the work machine 100. The engine in the engine compartment 108 may drive wheels 111 attached to the frame 104, in a manner known in the art.

Figure 2:
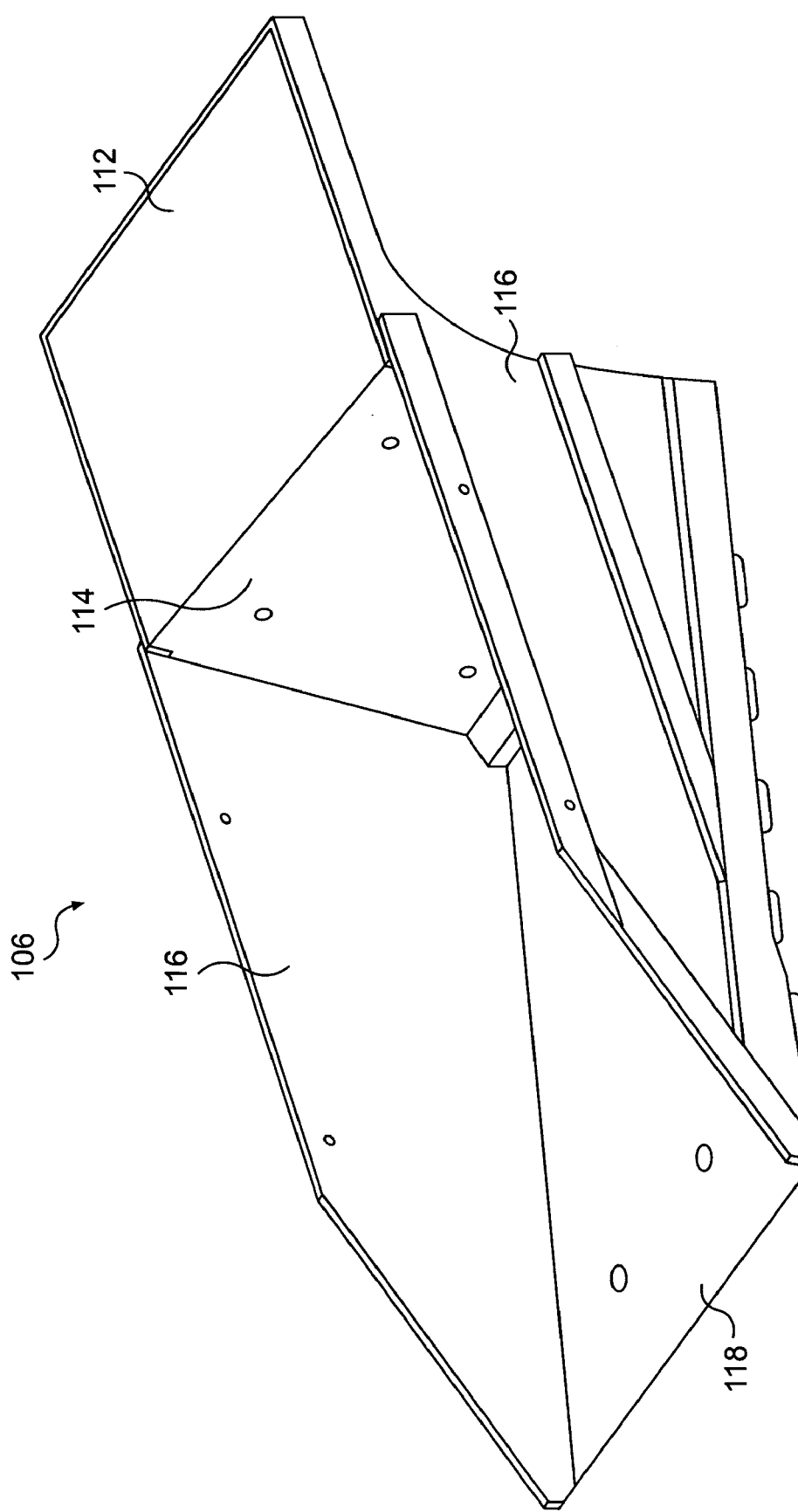
FIG. 2 is a pictorial representation of a payload container in accordance with one exemplary aspect the present disclosure.

The payload container 106 is attached to and supported by the frame 104. Referring to FIGS. 1 and 2, the payload container 106 may include a canopy 112, a front wall 114, sidewalls 116, and a floor 118. It should be understood, however, that the payload container 106 may vary from the exemplary payload container of FIGS. 1 and 2. For example, other exemplary payload containers may not include a canopy, while others may have sidewalls that converge together obviating the need for a floor. Other exemplary payload containers would be apparent to one skilled in the art.

The canopy 112 may extend from the front wall 114 over the operator's cab 110. The canopy 112 is configured to provide protection to the operator's cab 110 from earth, debris, and/or other material that may be inadvertently loaded onto the canopy 112. In addition, the canopy 112 is configured to support the weight of a part of a payload. This is a precaution taken because material to be hauled may be inadvertently dumped on the canopy 112 during loading or may fall on the canopy 112 when the container is over-filled.

The front wall 114 may be located behind the operator's cab 110, extending between the canopy 112 and the floor 118. The front wall 114 may be substantially vertical or angled from the floor 118 to the canopy 112, and may be configured to withstand forces applied against it by a payload within the payload container 106. Sidewalls 116 (only one of which is shown in FIG. 1) may extend rearward from the front wall 114. These may connect to the floor 118, along with the front wall 114, to form a box-like structure for receiving and carrying a payload. A tailgate (not shown) may be provided at the rear of the payload container 106 to prevent a load from spilling during transport.

As shown in FIG. 1, the payload container 106 may be connected to the frame 104 by a pivoting body support 120. The body support 120 may be located toward the rear end of the payload container 106. Cylinder brackets 122 may be provided on the underside of the payload container 106 and may be positioned toward the front end of the payload container 106. An actuator 124, such as a hydraulic cylinder, may extend between the frame 104 and the cylinder brackets 122 and may be actuated to raise a front end of the payload container 106 to dump a payload.

Figure 3:
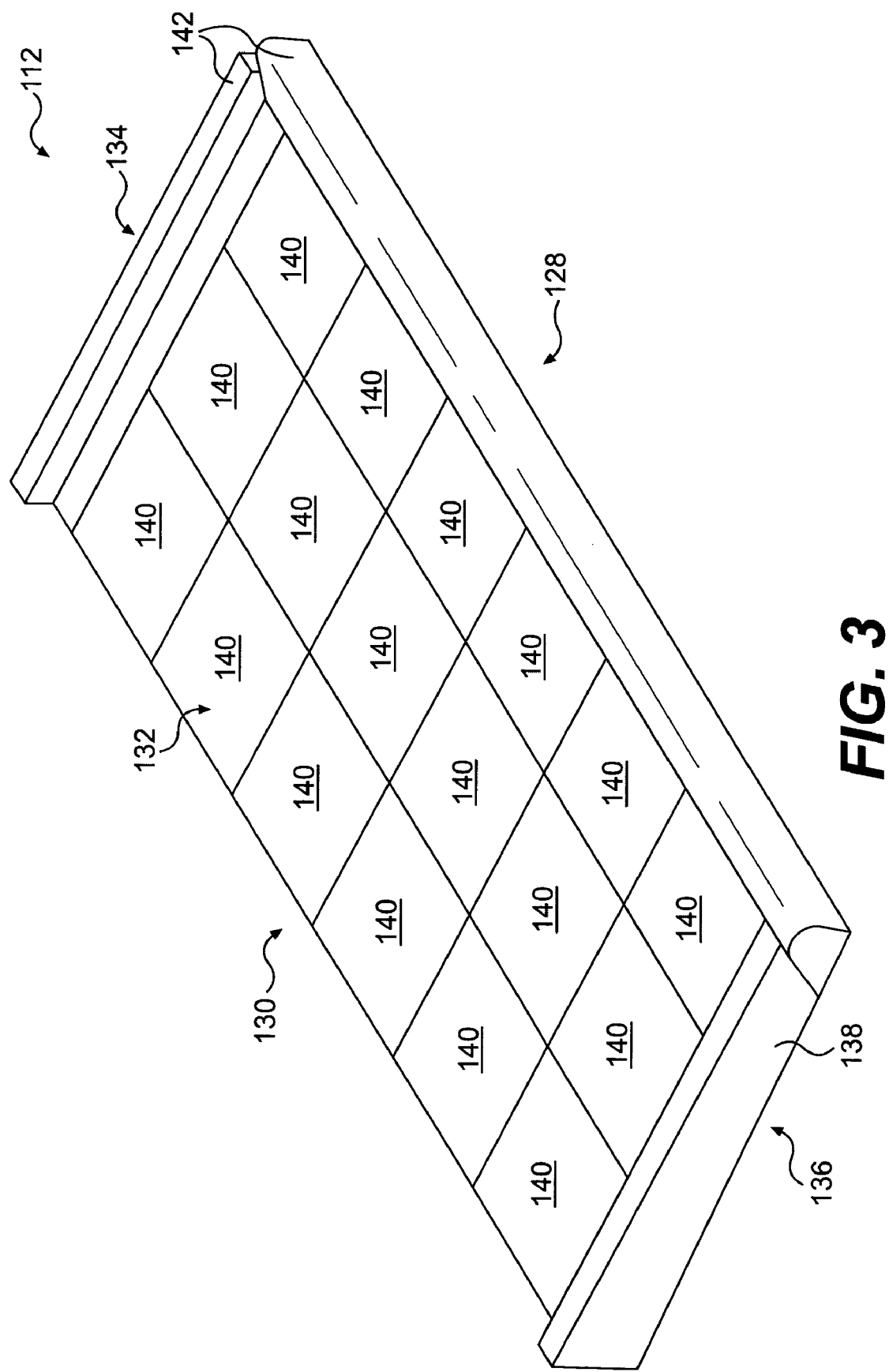
FIG. 3 is a pictorial representation of a top view of a canopy of a payload container in accordance with one exemplary aspect the present disclosure.
Figure 4:
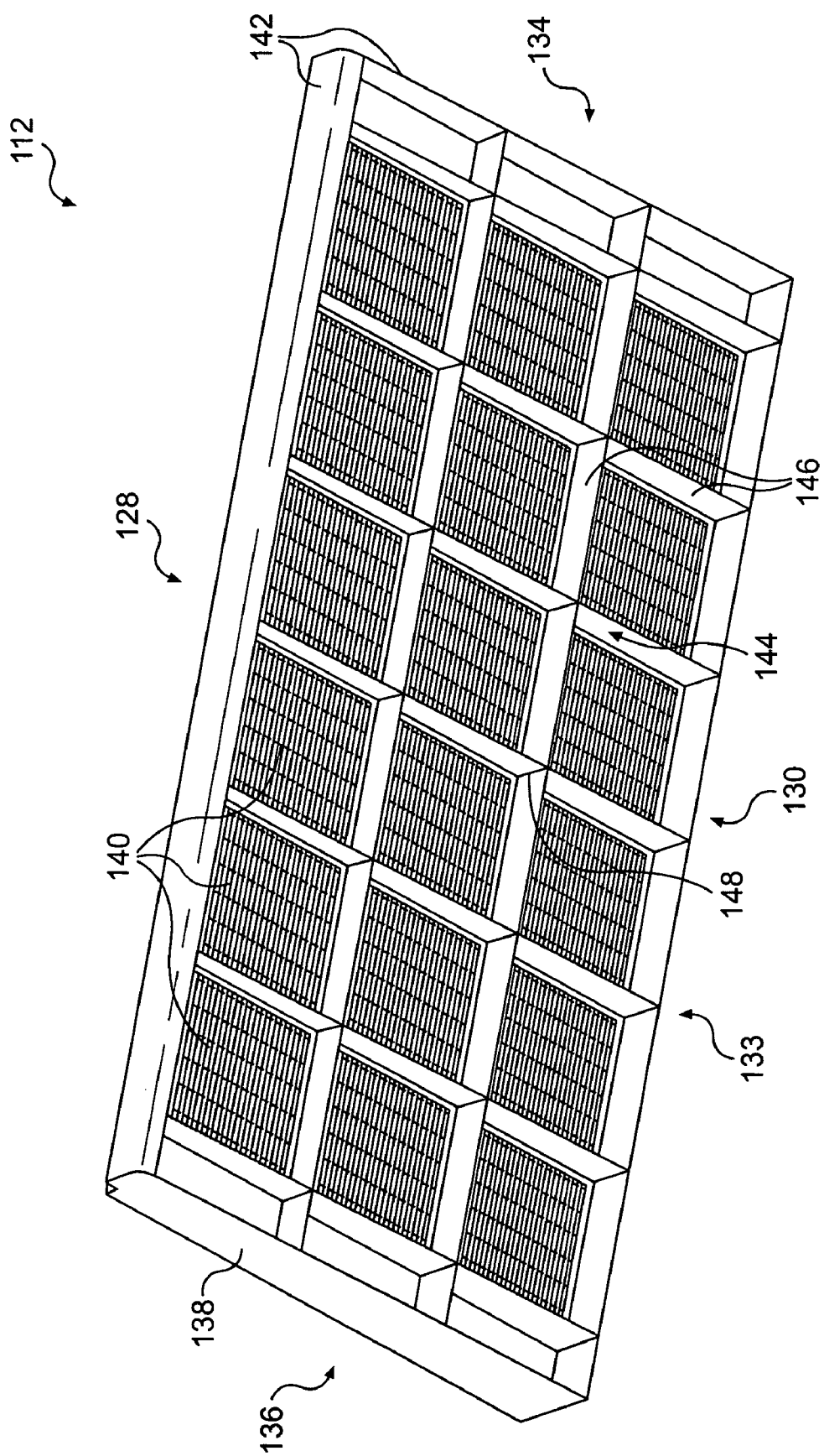
FIG. 4 is a pictorial representation of a bottom view of the exemplary canopy of FIG. 3.

FIGS. 3 and 4 respectively show a top view and a bottom view of the canopy 112 of the exemplary payload container 106. The canopy 112 includes a canopy front end 128, a canopy back end 130, a top surface 132 (FIG. 3), a bottom surface 133 (FIG. 4), a first side edge 134, and a second side edge 136. The canopy front end 128 extends toward the front end 102 of the work machine 100 (in FIG. 1) while the canopy back end 130 connects to the front wall 114.

The canopy 112 may include a frame structure 138 and panels 140. The frame structure 138 may include an edge frame 142 and a mounting frame 144, best seen in FIG. 4. The edge frame 142 extends along the front end 128 and side edges 134, 136, while the mounting frame 144 includes intersecting ribs 146 extending longitudinally and laterally across the canopy 112 forming a grid. The intersecting ribs 146 may be formed of lengths of plate material welded or otherwise attached together at intersections 148.

In one exemplary embodiment, the edge frame 142 and the mounting frame 144 are manufactured of a metal material strong enough to support the weight of a payload that may be inadvertently dumped on the canopy 112. In another exemplary embodiment, the edge frame 142 and the mounting frame 144 are manufactured of a non-metal material strong enough to support the weight of a payload that may be inadvertently dumped on the canopy 112.

The exemplary canopy 112 shown in FIGS. 3 and 4 includes eighteen panels 140, although any number of panels 140 may be used. To secure these panels 118 in the canopy 112, the ribs 146 of the mounting frame 144 are configured to form receptacles, one for each of the panels 140, supporting the panels 140 at spaced intervals. In one exemplary embodiment, the ribs 146 fit around the exterior of each panel 140.

Figure 5:
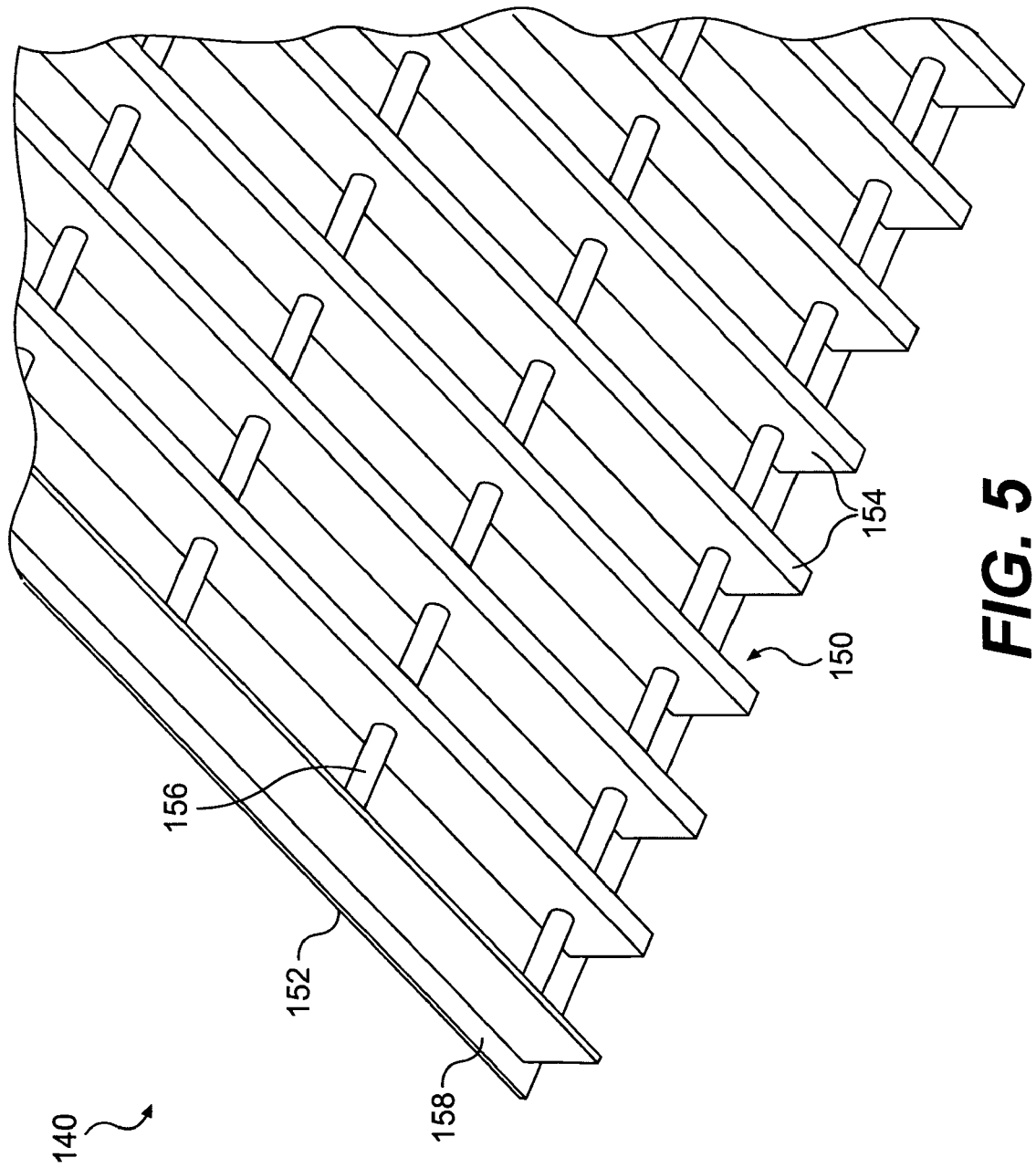
FIG. 5 is a pictorial representation of an exemplary panel used to form the canopy of FIG. 3.

FIG. 5 is a partial pictorial representation of a part of a single panel 140. The panel 140 includes grating 150 and a top sheet 152. The grating 150 includes support beams 154 and cross-bars 156. In the exemplary embodiment shown, the beams 154 are shaped as a solid rectangular bar. However, the beams 154 could have the shape of an I-beam, T-beam, or other shape as would be apparent to one in the art. The beams 154 extend from one end of the panel 140 to the other and, in the embodiment shown, are aligned in parallel and placed adjacent to each other. The beams 154 may be formed of a lightweight, non-metal material, thereby resulting in weight savings compared to metal formed payload containers 106. In one exemplary embodiment, the beams 154 are formed of a pultruded fiberglass material. In another exemplary embodiment, the beams are formed of a polymer, such as an extruded or protruded polymer, a resin, or a composite material, such as, for example, a carbon fiber composite.

The cross-bars 156 extend through bores in each beam 154 transverse to the length of the beams 154. The cross-bars 156 may be formed of a non-metal material such as a pultruded fiberglass material. Alternatively, the cross-bars 156 could be formed of a metal material, such as aluminum or steel to provide support and stability to the beams 154.

Along one edge of the beams 154, the top sheet 152 may be disposed, forming the top surface of the panel 140, and thereby also forming the top of the canopy 112. Because of this, the top sheet 152 may come into direct contact with any material dumped on the canopy 112. The top sheet 152 may have a length and width greater than the length and width of the grating 152. In one exemplary embodiment, the top sheet may extend beyond the edges of the grating 152, forming an overhang 158 at the edges of the panel 140. The overhang 158 could overhang the grating 152 by any desired distance. In one exemplary embodiment, the overhang 158 is about 20 mm.

The top sheet 152 may be formed of a non-metal material, such as, for example, fiberglass. However, the top sheet could be formed of other materials having a resistance to wear and that are capable of holding at least a portion of the weight of a payload, when reinforced by the beams 154, that may be inadvertently dumped on the canopy 112. For example, the top sheet 142 could be formed of a polymer, such as Tivar® 88, woven glass, ultra-high molecular weight products, carbon fiber, and Kevlar®. Other materials may also be used. In addition, the top sheet 152 may include a protective coating, such as a urethane or rubber coating, along the top surface to further protect the top sheet 152 from the impact and abrasion that comes from a payload being dumped on the top sheet 152.

The top sheet 152 may be fastened or bonded to the grating 150 using any fastening or bonding method known in the art. In the example where the grating 150 and the top sheet 152 are formed of a non-metal material such as fiberglass, the bonding may be accomplished using an appropriate adhesive, an epoxy, thermal adhesion, or other bonding method known in the art. Both the grating 150 and the top sheet 152 are available from conventional fiberglass manufacturers, such as American Grating of Los Angeles, Calif.

A seal material (not shown) may be included along the bottom side of the overhang 158 of the top sheet 152, adjacent to edges of the beams 154. The seal material seals gaps between the top sheet 152 and the frame structure 138 of the canopy 112, thereby minimizing leaking of water through the canopy 112 and minimizing falling dirt or other debris through any gaps on the canopy 112. The seal material may be a foam or polymer material sufficient to fill any gaps in the canopy 112. In one exemplary embodiment, the seal material is an adhesive backed foam tape, such as foam tape of the type used to seal or block drafts through gaps in home windows. In another exemplary embodiment, the seal material could be a silicon caulking material. In yet another exemplary embodiment, the seal material is not included on the canopy.

The dimension of the panels may vary depending upon a number of factors, such as the overall size of the canopy. In one exemplary embodiment, each panel 140 is about 900 mm square. In another exemplary embodiment, each panel 140 is about 1 meter by 2 meters. The canopy 112 may be about 4 meters in length and about 6.5 meters wide, and may include any number of panels 140 of a variety of sizes.

Figure 6:
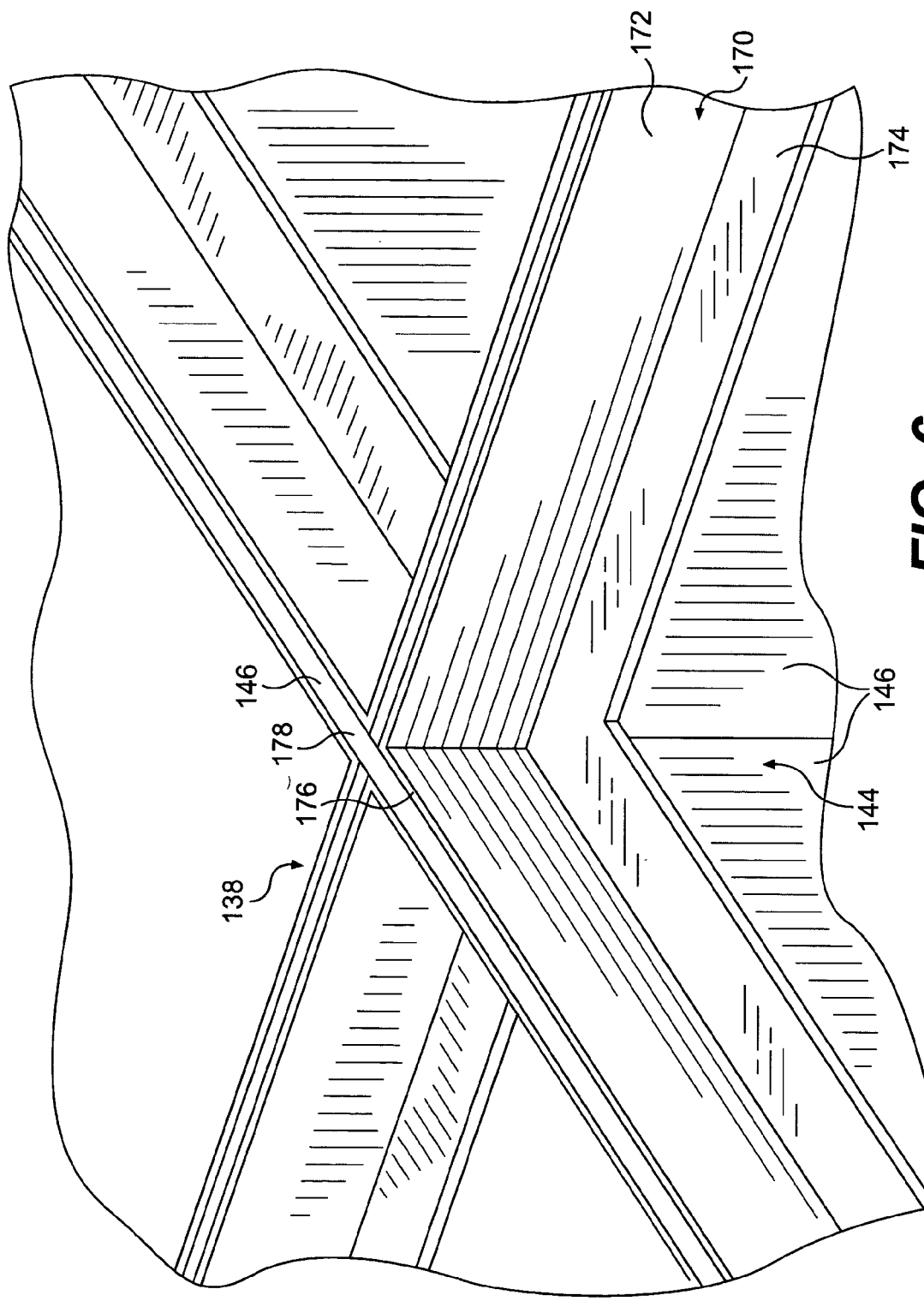
FIG. 6 is an enlarged pictorial representation of a support structure used in the exemplary canopy of FIG. 3.

FIG. 6 shows a top view of the frame structure 138 of the canopy 112, including the mounting frame 144 and a panel frame 170 without the panels 140. As shown in FIG. 6, the panel frame 170 is attached to the ribs 146 of the mounting frame 144. In this exemplary embodiment, the panel frame 170 is an L-shaped beam having a shank portion 172 and a bearing portion 174. The shank portion 172 may be attached to the mounting frame 144, such as by welding or bonding, and may have a top edge 176 placed to be flush or near flush with a top edge 178 of the ribs 146 of the mounting frame 144. In one exemplary embodiment, the shank portion 172 may be recessed from the top edge 178 of the ribs 146 by a distance generally corresponding to the height of the beams 154 of the panels 140. The bearing portion 174 may extend at a right angle from the shank portion 172 and may be used as a ledge to support the panels 140.

Figure 7:
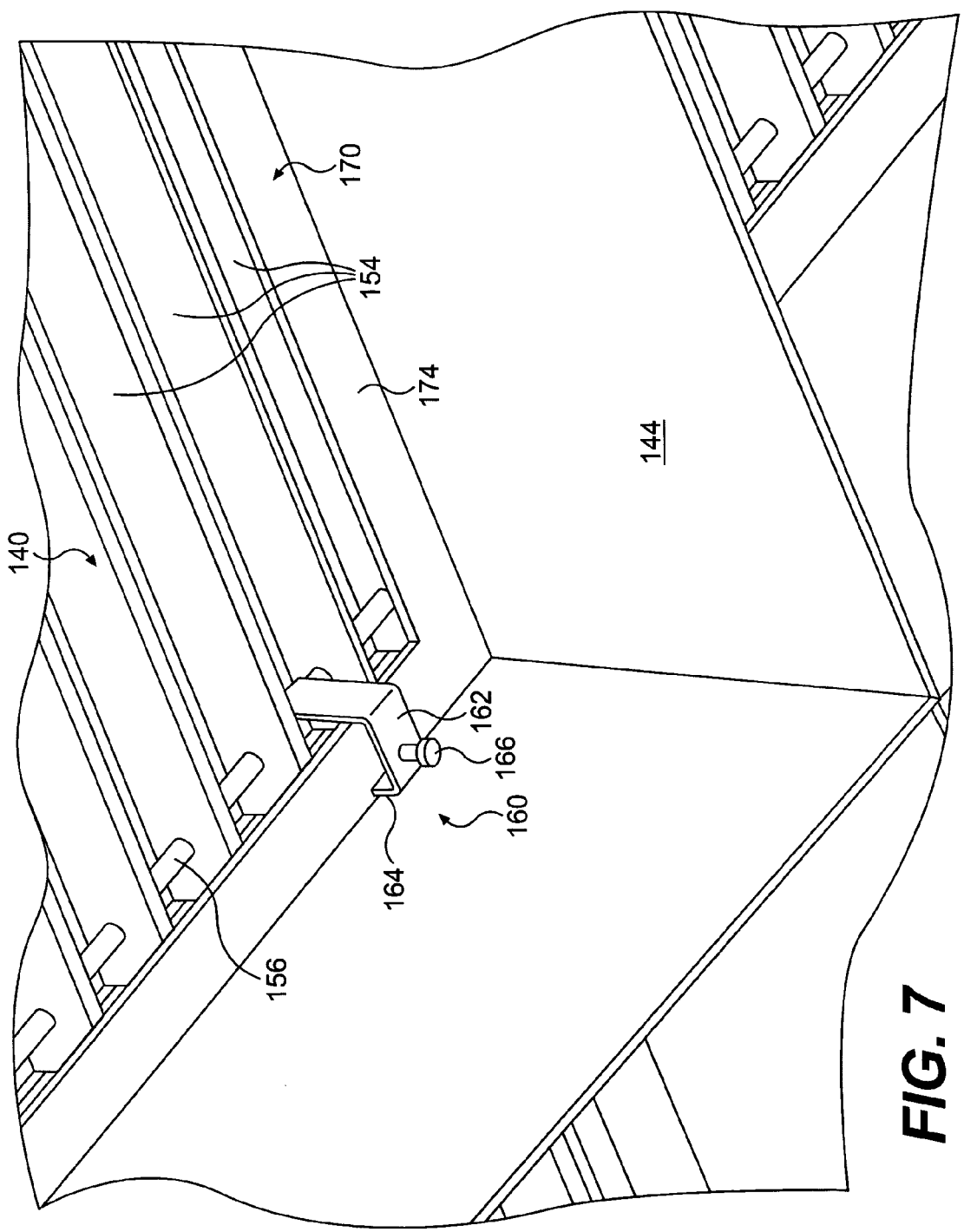
FIG. 7 is a pictorial representation of a bottom view of a panel attached to a support structure of the exemplary canopy of FIG. 3.

FIG. 7 shows a bottom view of the mounting frame 144 and the bearing portion 174 of the panel frame 170 supporting the panel 140. Ends of the beams 154 may rest on the bearing portion 174 of each panel frame 170. Likewise, the beams 154 on the outer most edges of the panels 140 may also rest on the bearing portion 174 of the panel frame 170. Accordingly, in the canopy 112, a panel 140 may be placed within a panel frame 170 and securely held in place by resting the beams on the bearing portion 174. In one exemplary embodiment, a reinforcement bar (not shown) is attached at both ends to the mounting frame 144, and extends below the central area of each panel 140, thereby spanning the width of the panel 140 and providing support to the central area of the panel 140. Accordingly, in such an embodiment, each panel 140 is supported at its edges by the bearing portion 174 and is supported in its central area by the reinforcement bar. Any number of reinforcement bars may be used.

A retention system 160 may also be included with the panels 140 and may be used to secure the panels 140 to the panel frame 170. The retention system 160 may include an angle bracket 162, a hook 164, and a bolt 166. The angle bracket 162 may include a bend (not shown) configured to extend around and attach to a part of a cross-bar 156 of the panel 140. The angle bracket 162 may be configured to extend from the cross-bar 156 above the bearing portion 174 of the panel frame 170 to an area below the bearing portion 174. The bolt 166 may be tightened to pull the panel 140 tight against the bearing portion 174 of the panel frame 170. When the panel 140 is secured in place, the overhang 158 (FIG. 5) on the panel 140 may cover the top edge 176 of the panel frame 170 (FIG. 6).

In another exemplary embodiment (not shown), the retention system attaches the panels 40 to the mounting frame 144. A clip may connect to the beams 154 next to the panel frame. In this embodiment, the beams 154 may be I-beams, and the clip may connect to the beam in a manner known in the art. A bolt may extend through a hole or slot in the mounting frame into a threaded bore in the clip. The bolt may be tightened to secure the clip and panel to the mounting frame. Other retention systems would be apparent to one skilled in the art.

INDUSTRIAL APPLICABILITY

The panels 140 described herein may be used in place of heavy metal sheets that are currently used to form payload containers. The panels may also be used in areas that may be required to directly hold the weight of a part of a payload, such as the canopy 112. In addition, the panels may be used to replace the metal sheets that form the sidewalls 116. Because the panels 140 may be formed of non-metal materials, the overall weight of the payload container 106 may be less than that of prior payload containers, while still being strong. In addition, when the canopy 112 is formed of the lightweight material, the center-of-gravity of the payload container is moved toward the back end of the work machine 100, shifting more weight to the rear wheels, and making dumping easier.

The disclosed panels 140 may also simplify repairs of the payload container 106. Damage to prior payload containers may be repaired by welding additional metal material to the damaged area, thereby increasing the weight of the payload container. The disclosed panel design allows an operator to replace a damaged section without adding additional weight or structure to the payload container. This is because a damaged panel may be entirely removed and replaced.

While payload containers utilizing the disclosed panels may be repaired according to various methods available to those skilled in the art, an exemplary method for repairing the payload container 106 will now be described. As an initial matter, an operator identifies a damaged panel and determines that the panel should be replaced. The damage may be a result of having been in direct contact with a load in the payload container 106, such as a load on the canopy 112 or a load pressing against the sidewalls 116. The operator may disconnect the panel 140 from the payload container 106 by disengaging a retention system, such as the retention system 160. With reference to the exemplary retention system shown, this may be accomplished by loosening the bolt 166 and then securing the angle bracket 162 in a manner to not interfere with the mounting frame 144 or the panel frame 170 as the panel 140 is removed, or alternatively, removing the angle bracket 162 completely from the panel 140 by disconnecting it from the cross-bar 156.

Once the retention system 160 is disengaged, the damaged panel may be removed from the mounting frame 144. Removing the damaged panel may include simply raising the panel from the mounting frame 144. The damaged panel 140 may then be discarded or, alternatively, recycled.

An undamaged, replacement panel may be placed in the mounting frame 144. This may include placing the undamaged panel in the panel frame 170. The undamaged panel may then be secured to the mounting frame 144 using a retention system, such as the retention system 160 including the angle bracket 162, hook 164, and bolt 166. For example, the angle bracket 162 may be attached to the cross-bar 156 and the hook 164 may be bolted to the bearing portion 174 of the panel frame 170, which is secured to the mounting frame 144.

Decreasing the overall weight of a work machine, such as, for example, by using a non-metal material in the payload container, enables an operator to carry larger payloads making mining or excavating more productive and making operation of the work machine more efficient without exceeding the maximum GVW. Additionally, the weight reduction when the payload container 106 is loaded below the maximum GVW makes the truck more fuel efficient. Accordingly, the operational lifetime of the truck may be increased.

It should be noted that although the panels 140 are described as part of the canopy 112, it is also anticipated that the non-metal panels may be used to form the sidewalls 116. In addition, it is anticipated that the non-metal materials may be used to form the front wall 114, the floor 1118, or the tailgate (not shown). Accordingly, the non-metal materials may be used any place in the payload container 106 that may directly contact or support the weight of at least a portion of a payload.

Although the disclosed embodiments are described as being used on a payload container for a dumping work machine 100, the non-metal panels 140 may be used in any container-type application. For example, the panels may be used on bucket devices, articulated trucks, paving equipment, off-highway tractors, and other equipment that may include a container required to withstand forces applied by payloads.

It will be apparent to those skilled in the art that various modifications and variations can be made in the disclosed embodiments without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A payload container for containing a material to be hauled by a work machine, comprising:
   a first sidewall and a second sidewall;
   a front wall extending between the first and second sidewalls; and
   a canopy extending from a top of the front wall, the canopy including
      a mounting frame, and
      at least one panel formed of a non-metal material, the at least one panel being secured to the mounting frame, wherein the at least one panel includes a plurality of panels disposed adjacent to each other and individually secured to the mounting frame.

2. The payload container of claim 1, further including a retention system, wherein each of the plurality of panels is removably secured to the mounting frame by the retention system.

3. The payload container of claim 1, wherein the canopy includes a plurality of panel frames attached to the mounting frame, each of the panel frames including a bearing portion configured to support one of the plurality of panels.

4. The payload container of claim 1, wherein the mounting frame supports the plurality of panels at spaced intervals along the at least one panel.

5. The payload container of claim 1, including a seal material at an edge of the plurality of panels for sealing between the edge and the mounting frame.

6. The payload container of claim 1, wherein the first and second sidewalls include a plurality of sidewall panels formed of a non-metal material.

7. The payload container of claim 1, wherein at least a portion of the plurality of panels is a beam formed of fiberglass.

8. The payload container of claim 1, wherein the plurality of panels includes a pultruded fiberglass grating material bonded to a sheet of fiberglass.

9. The payload container of claim 8, wherein the sheet of fiberglass is coated with at least one of urethane and rubber.

10. The payload container of claim 8, wherein the pultruded fiberglass grating material is an I-beam shape.

11. A work machine comprising:
    an engine;
    an engine compartment for housing the engine;
    a cab for an operator adjacent the engine compartment; and
    a payload container for containing a material to be hauled, the payload container including
       a floor,
       a first sidewall and a second sidewall at opposing sides of the floor,
       a front wall extending between the first and second sidewalls,
       a canopy extending from a top of the front wall, the canopy being configured to at least partially cover the cab of the work machine,
       the canopy including
          a mounting frame, and
          at least one panel formed of a non-metal material, the at least one panel being secured to the mounting frame, wherein the at least one panel includes a plurality of panels disposed adjacent to each other and individually secured to the mounting frame.

12. The work machine of claim 11, including a retention system, wherein each of the plurality of panels is removably secured to the mounting frame by the retention system.

13. The work machine of claim 11, wherein plurality of panels are is at least partially formed of a pultruded fiberglass grating material bonded to a solid sheet of fiberglass.

14. The work machine of claim 13, wherein the sheet of fiberglass is coated with at least one of urethane and rubber.

15. The work machine of claim 11, wherein the canopy includes a plurality of panel frames attached to the mounting frame, each of the panel frames including a bearing portion configured to support one of the plurality of panels.

16. The work machine of claim 11, wherein the mounting frame is a metal frame and the plurality of panels includes metal cross-bars connecting non-metal beams.

17. The work machine of claim 11, wherein the mounting frame supports the plurality of panels at spaced intervals along the plurality of panels.

18. The work machine of claim 11, wherein at least a portion of the canopy is formed of fiberglass.

19. The work machine of claim 18, wherein the canopy includes a pultruded fiberglass grating material bonded to a sheet of fiberglass.

* * * * *